United States Patent
Siegers

(10) Patent No.: US 10,766,974 B2
(45) Date of Patent: Sep. 8, 2020

(54) ULTRAFILTRATION OF POLYISOOLEFIN COPOLYMERS AND POLYISOOLEFIN COPOLYMERS WITH REDUCED OLIGOMER CONTENT

(71) Applicant: ARLANXEO Singapore Pte. Ltd., Singapore (SG)

(72) Inventor: Conrad Siegers, Edmonton (CA)

(*) Notice: Subject to any disclaimer, the term of this patent is extended or adjusted under 35 U.S.C. 154(b) by 0 days.

(21) Appl. No.: 15/535,857

(22) PCT Filed: Jul. 7, 2015

(86) PCT No.: PCT/CA2015/050628
§ 371 (c)(1),
(2) Date: Jun. 14, 2017

(87) PCT Pub. No.: WO2016/095018
PCT Pub. Date: Jun. 23, 2016

(65) Prior Publication Data
US 2017/0349676 A1    Dec. 7, 2017

Related U.S. Application Data

(60) Provisional application No. 62/094,114, filed on Dec. 19, 2014.

(51) Int. Cl.
| | |
|---|---|
| C08F 6/10 | (2006.01) |
| C08F 210/12 | (2006.01) |
| C08F 6/12 | (2006.01) |
| B01D 61/14 | (2006.01) |
| C08J 3/24 | (2006.01) |

(52) U.S. Cl.
CPC .............. *C08F 6/10* (2013.01); *B01D 61/145* (2013.01); *C08F 6/12* (2013.01); *C08F 210/12* (2013.01); *C08J 3/24* (2013.01); *B01D 2315/10* (2013.01); *C08J 2323/22* (2013.01)

(58) Field of Classification Search
CPC combination set(s) only.
See application file for complete search history.

(56) References Cited

U.S. PATENT DOCUMENTS

| | | | |
|---|---|---|---|
| 2,356,128 A | 8/1944 | Thomas et al. | |
| 5,290,873 A * | 3/1994 | Noda | C08F 10/10 525/244 |
| 6,075,073 A | 6/2000 | McGlothlin et al. | |
| 7,071,292 B2 | 7/2006 | Achten et al. | |
| 2003/0216264 A1* | 11/2003 | Bartley | C07C 13/18 508/110 |
| 2005/0197486 A1 | 9/2005 | Achten et al. | |
| 2008/0051544 A1 | 2/2008 | Puskas | |
| 2014/0194576 A1* | 7/2014 | Jin | B60C 1/0016 525/210 |

FOREIGN PATENT DOCUMENTS

| | | |
|---|---|---|
| CA | 1137671 A | 12/1982 |
| CN | 100404560 C | 7/2008 |
| CN | 106661144 A | 5/2017 |
| EP | 2610296 A1 | 7/2013 |
| EP | 2966097 A1 | 1/2016 |
| GB | 867996 A * | 5/1961 |
| JP | S5250344 A | 4/1977 |
| WO | 2016011546 A1 | 1/2016 |

OTHER PUBLICATIONS

Zwijnenberg et al. "Important factors influencing molecular weight cut-off determination of membranes in organic solvents", Journal of Membrane Science, 2012, 390-391, 211-217. (Year: 2012).*
International Search Report and Written Opinion dated Sep. 23, 2015 for corresponding International Application No. PCT/CA2015/050628 (8 pp. total).
Extended European Search Report dated Jul. 19, 2018 for corresponding European Patent Application No. 15868760.8 (9 pp. total).
Office Action dated Feb. 22, 2019 for corresponding Chinese Patent Application No. 201580069404.9 (13 pp. total).
Takeshi et al., "Concentration of Rubber Latexes", XP-002734910, retrieved from CAPLUS, Database accession No. 1977-503217, Apr. 22, 1977, Abstract (2 pp. total).

* cited by examiner

Primary Examiner — Nicole M. Buie-Hatcher
(74) *Attorney, Agent, or Firm* — The Dobrusin Law Firm, PC

(57) ABSTRACT

A method of separating a polyisoolefin elastomer from non-polymeric components in an organic solvent involves ultrafiltration of a solution of the polyisoolefin elastomer and non-polymeric components in an organic solvent through a semipermeable membrane to substantially retain the polyisoolefin elastomer in a retentate and provide the non-polymeric components in a permeate. Advantageously, stabilizers for the polyisoolefin elastomer are retained in the retentate along with the polyisoolefin elastomer, permeate flux through the membrane is higher as concentration of the polyisoolefin elastomer in the solution increases up to a concentration limit, the separated polyisoolefin elastomer in the retentate has a molecular weight that can be substantially unchanged even when ultrafiltration is conducted at elevated temperature and the amount of polyisoolefin elastomer in the permeate is unmeasurable providing an oligomer-rich permeate uncontaminated by polyisoolefin elastomer. A process for curing a polyisoolefin copolymer involves reducing content of an oligomer to 900 ppm or less in a mixture of the oligomer and the polyisoolefin copolymer to produce an oligomer-depleted mixture, and adding a resin cure system to the oligomer-depleted mixture to cure the polyisoolefin copolymer.

29 Claims, 4 Drawing Sheets

ULTRAFILTRATION OF POLYISOOLEFIN COPOLYMERS AND POLYISOOLEFIN COPOLYMERS WITH REDUCED OLIGOMER CONTENT

FIELD

This application relates to polyisoolefin copolymers, for example butyl rubber, in particular to polyisoolefin copolymers with reduced oligomer content and to the ultrafiltration of polyisoolefin copolymers.

BACKGROUND

Poly(isobutylene-co-isoprene), or IIR, is a synthetic elastomer commonly known as butyl rubber which has been prepared since the 1940's through the random cationic copolymerization of isobutylene with small amounts of isoprene (1-5 mole %). As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as comonomers. Commercial butyl comprises as major portion of isoolefin and a minor amount, usually not more than 2.5 mol %, of a conjugated multiolefin. Butyl rubber or butyl polymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295.

Halogenation of butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company© 1987), particularly pp. 297-300.

The presence of allylic halide functionalities allows for nucleophilic alkylation reactions. It has been recently shown that treatment of brominated butyl rubber (BIIR) with nitrogen and/or phosphorus based nucleophiles, in the solid state, leads to the generation of IIR-based ionomers with interesting physical and chemical properties (see: Parent J S, Liskova A, Whitney R A, Resendes R. Journal of Polymer Science, Part A: Polymer Chemistry 43, 5671-5679, 2005; Parent J S, Liskova A, Resendes R. Polymer 45, 8091-8096, 2004; Parent J S, Penciu A, Guillen-Castellanos S A, Liskova A, Whitney R A. Macromolecules 37, 7477-7483, 2004). The ionomer functionality is generated from the reaction of a nitrogen or phosphorus based nucleophile and the allylic halide sites in the halogenated butyl rubber to produce a ammonium or phosphonium ionic group respectively. The physical properties of these halogenated butyl based ionomers, such as green strength, modulus, filler interactions etc., are superior to those of their non-ionomeric counterpart.

Butyl rubber production produces small amounts of cyclic oligomers as side products. Such cyclic oligomers may be undesirable in certain applications of butyl rubber, for example in pharmaceutical seals, closures, medical devices and food grade applications, therefore a reduction in cyclic oligomer levels in the butyl rubber may be desirable. Furthermore, such cyclic oligomers may themselves find utility in certain applications such as precursors for the production of lubricants and traction fluids, therefore obtaining the cyclic oligomers themselves may also be desirable.

It is known from U.S. Pat. No. 7,071,292 and European Patent Publication EP 2610296 that solutions of nitrile rubber and other elastomers in an organic solvent may be purified by ultrafiltration methods. Impurities removed by these processes include emulsifiers, organic and/or inorganic salts or acids such as fatty acids and resins, water, unreacted initiator residues and/or decomposition products, stabilizers, molecular weight regulators, monomers, processing agents, such as flocculants, oligomeric components with a molecular weight of less than 2000 g/mol and transition metal catalysts for the hydrogenation or metathesis, oxidizing and/or reducing agents and/or components of these transition metal catalysts, oxidizing and/or reducing agents preferred impurities are fatty acids, fatty acid esters and Na, K, Ca salts of fatty acids, or resin acids, stabilizers, flocculants water, catalyst components, and ligands.

There remains a need for a method of separating polyisoolefin elastomers, especially butyl rubber, from other components of a polyisoolefin elastomer solution, preferably while retaining sufficient levels of stabilizers in the polyisoolefin elastomer.

SUMMARY

There is provided a method of separating a polyisoolefin elastomer from non-polymeric components in an organic solvent, the method comprising filtering a solution of the polyisoolefin elastomer and non-polymeric components in an organic solvent through a semipermeable ultrafiltration membrane to substantially retain the polyisoolefin elastomer in a retentate and provide the non-polymeric components in a permeate.

There is further provided a permeate produced by the method.

There is further provided a retentate produced by the method.

There is further provided a process for curing a polyisoolefin copolymer comprising reducing content of an oligomer to 900 ppm or less in a mixture of the oligomer and the polyisoolefin copolymer to produce an oligomer-depleted mixture, and adding a resin cure system to the oligomer-depleted mixture to cure the polyisoolefin copolymer.

The present method is particularly useful for separating a polyisoolefin copolymer (e.g. butyl rubber) from oligomers (e.g. $C_{13}$ and $C_{21}$ cyclic oligomers) produced during the production of the polyisoolefin copolymer. Unlike the ultrafiltration of nitrile polymers as described in U.S. Pat. No. 7,071,292 and EP 2610296, the present method surprisingly results in stabilizers being retained in the retentate along with the polyisoolefin elastomer, thereby obviating the need to produce the polyisoolefin elastomer in the presence of an excess of stabilizer or to add extra stabilizer during or after the ultrafiltration. The polyisoolefin produced by the method has a desirably low cyclic oligomer content of less that about 900 ppm, more desirably less than about 500 ppm, even more desirably less than about 400 ppm, even more desirably less than about 250 ppm, even more desirably less than about 200 ppm, even more desirably less than about 150 ppm, even more desirably less than about 100 ppm.

Further, in contrast to commonly understood ultrafiltration processes, the present method results in higher permeate flux through the membrane as concentration of the polyisoolefin elastomer in the solution increases up to a concentration limit. It is normally thought that as polymer concentration increases from 0 wt. %, flux through the membrane reduces due to pore blockage.

Furthermore, the purified polyisoolefin elastomer in the retentate has a molecular weight that can be substantially unchanged even when ultrafiltration is conducted at elevated temperature.

Additionally, the permeate is substantially free of polyisoolefin elastomer and useful as an industrial intermediate or in other applications.

In addition, reducing oligomer content to 900 ppm or less in a mixture containing a polyisoolefin elastomer and oligomers produced during the production of the polyisoolefin elastomer results in a surprising increase in the cure state of the polyisoolefin elastomer when the polyisoolefin elastomer is cured with a resin cure system. Consequently, less curative would be required to obtain a cured polyisoolefin elastomer having substantially the same physical properties as a polyisoolefin elastomer cured with the same cure system when the polyisoolefin elastomer is in a mixture with more than 900 ppm of oligomers.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
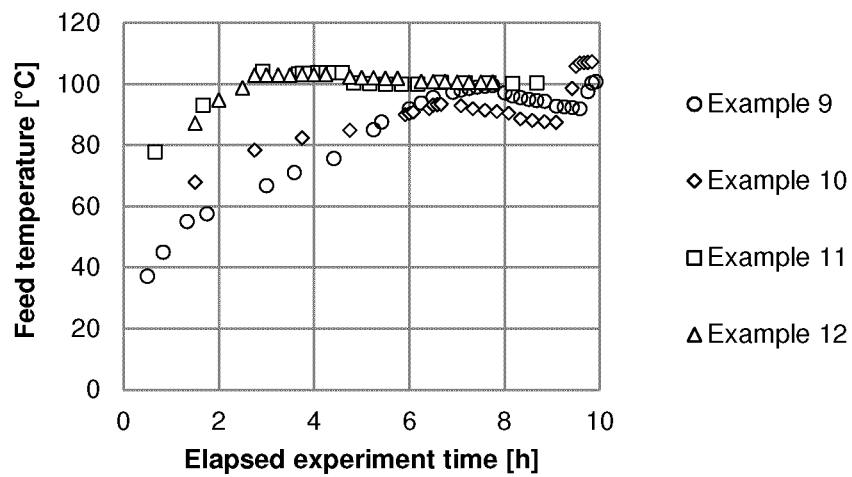
FIG. 1 depicts a graph showing feed temperature as function of time during ultrafiltration (UF) experiments (Examples 9-12).

Unpurified polyisoolefin elastomer contains the polyisoolefin elastomer, initiator residue, oligomer side products (e.g. cyclic oligomers, for example $C_{13}$ and $C_{21}$ cyclic oligomers), optionally stabilizers (e.g. antiagglomerants and acid scavengers), optionally antioxidants and other impurities depending on the exact process used to make the polyisoolefin elastomer. Some of these components form a homogeneous solution in an organic solvent, while others stay particulate in an organic solvent.

The method of the present invention involves subjecting a solution of unpurified polyisoolefin elastomer in an organic solvent to ultrafiltration. The ultrafiltration is used to separate some of the components of the solution in the presence of dissolved elastomer. To this end, the elastomer contained in the solution, as well as the other components, are preferably passed one or more times under pressure over a semipermeable membrane, which permits passage of the solvent, as well as homogeneously dissolved other components contained in the solvent (permeate), but retains the dissolved elastomer (retentate). In this way, the elastomer-depleted permeate may be collected separately from the elastomer-rich retentate. Or, in another way of viewing the method, the oligomer-rich permeate may be separated from the oligomer-depleted retentate. Isolating oligomer-depleted elastomer from the retentate may be accomplished in any suitable manner, for example evaporation of the solvent, steam stripping, finishing or dry finishing.

For the ultrafiltration membrane, it is possible to use any semipermeable and durable size exclusion barrier known in the art of ultrafiltration or nanofiltration. Ultrafiltration membranes which have a highly porous outer layer (support layer) and further more finely porous inner layers (separating layer) are preferred. The highly porous outer layer may be a fabric or nonwoven or a ceramic substructure. The term "highly porous" is intended to mean an average pore diameter of the outer layer in the range of more than about 500 nm. The inner layers are symmetric or asymmetric membranes of suitable polymers applied to the outer layers, or a further more finely porous ceramic layer. The inner layers are more finely porous than their respective outer layer. The pore diameters of the inner layers may also become continuously smaller from the outside inwards. The average pore size of the inner layers, or of at least one inner layer, lies in the range of about 0.5-200 nm, preferably in the range of about 1-50 nm. The exclusion limit of such a membrane being used, which contains outer and inner layers, therefore also lies in the range of about 0.5-200 nm. The membrane may furthermore have a thin range of about 1-50 nm. The membrane may furthermore have a thin separating layer on the surface, which optionally contains ionic groups.

Suitable polymeric membrane materials for both the outer layer and the inner layer of the membrane include polysulfones, polyether sulfones, polyamides, polyimides (also silicone-coated polyimides), polyether ketones, polyureas, polyurethanes, polyvinylidene difluoride, cellulose acetates, cellulose nitrates, polycarbonates, polyacrylonitrile and polyepoxides. Membranes based on oxides, carbonates, carbides and nitrides of the elements aluminum, antimony, barium, beryllium, bismuth, boron, hafnium, cobalt, manganese, magnesium, nickel, silicon, thorium, titanium, tungsten and zirconium, sometimes mixed, are typically used as ceramic components.

Ultrafiltration membranes are generally provided in modules. Any commercially available type of module may be employed. For continuous ultrafiltration methods, suitable membrane modules include, for example, plate modules, coil modules, tube modules, capillary modules and multi-channel modules, which may optionally be supported by integrated flow spoilers.

Various ultrafiltration techniques may be employed. In a preferred embodiment, the solution of unpurified polyisoolefin elastomer and other components is subjected to crossflow filtration to get high flux. The method may be carried out either batch or continuously. A continuous method is preferred. In a continuous method, membrane modules may be operated in a cascade fashion. The other components may thus be removed stepwise and different concentrations of other components in the elastomer solution may be targeted.

Pressures under which the ultrafiltration may be performed may be in a range of about 1-80 bar, preferably about 2-50 bar. The separated filtrate (permeate) contains the other components, and may be replaced by fresh solvent if the intention is to avoid concentrating the elastomer solution to be extracted (retentate). An advantage with this method is that the residual concentration of the other components in the purified elastomer can be adjusted in any desired way through the amount of solvent replaced. Preferably, the ultrafiltration is performed at constant volume in which fresh organic solvent is added to the retentate to maintain a constant volume of retentate throughout the ultrafiltration.

Maintaining a high flux in a crossflow filtration technique requires a high crossflow velocity. High elastomer concentration in the solution is desirable, but high viscosity resulting from high molecular weight polyisoolefin elastomer at high concentration is undesirable. Crossflow filtration at elevated temperature allows processing at high concentration and lower viscosity, thus ultrafiltration at an elevated operating temperature is preferred. The operating temperature is preferably at most about 150° C., more preferably in a range of about 40-130° C. An upper limit (increasing concentrations) may be placed on the concentration of the elastomer in the solution to be treated by ultrafiltration by the increasing viscosity. This in turn depends on the molecular weight and the monomer composition of the elastomer. In order to reduce the viscosity of the elastomer solution, it is advantageous to heat the solution. The concentration limit of the solution to be separated is preferably in a range of about 2-40 wt. % based on total weight of the solution, more preferably about 5-20 wt. %. The crossflow velocity preferably provides a flow rate of the retentate past the membrane of not less than about 0.5 m/s. Slower flow rates may result in concentration polarization and a drop in permeate flux rate if there are high elastomer concentrations of more than 3 wt. %. A crossflow rate in a range of about 0.5-10 m/s is preferred, more preferably 0.5 to 5 m/s, even more preferably 0.5 to 2 m/s.

Some polyisoolefin elastomers require the presence of stabilizers to prevent degradation or other microstructural or molecular weight changes. Further, certain polyisoolefin elastomers are particularly sensitive to the presence of hydrogen halide, and unwanted microstructural and/or molecular weight changes in the elastomer can be accelerated at elevated temperatures. For example, although bromination of butyl rubber at moderate temperature (e.g. room temperature, 25° C.) can result in a brominated polymer with a high proportion of secondary allylic bromide, and minor amounts of tertiary, isomerization to a primary allylic structure increases at elevated temperatures, and isomerization at elevated temperature is also increased in an acidic environment. Therefore, especially when ultrafiltration is performed at elevated temperature, the presence of one or more suitable stabilizers in the retentate is desired.

Thus, it is a particularly advantageous aspect of the present method that ultrafiltration may be performed at elevated temperature in the presence of non-permeating stabilizers, resulting in an efficient ultrafiltration process in which the retentate contains purified polyisoolefin elastomer while retaining at least one of the one or more stabilizers, and the permeate is homogeneous and contains other components that were impurities to the polyisoolefin elastomer where some of the other components may be products unto themselves (e.g. cyclic oligomers).

The one or more stabilizers are preferably acid scavengers and/or antiagglomerants. The stabilizers are preferably particulate solids that do not dissolve in the solution of elastomer in the organic solvent, or non-permeating liquids (e.g. pure liquids or solutions) that are immiscible with the solution of elastomer in the organic solvent. The one or more stabilizers is preferably retained in the retentate in an amount of about 80 wt. % or more, more preferably about 90 wt. % or more, yet more preferably about 95 wt. % or more, based on the weight of the original amount of stabilizer, thereby affording a permeate that is essentially free of the stabilizer.

For example, in case of the ultrafiltration of halogenated polyisolefin elastomers, it is desirable to choose an acid scavenger that remains in the retentate, but does not pass over into the permeate and therefore eliminates the need for replenishment of acid scavenger or the need for a separation process to remove excess acid scavenger from the permeating solvent. Use of such an acid scavenger reduces isomerization and molecular weight degradation during the ultrafiltration process at room temperature but especially at elevated temperature, for example at a temperature in a range of about 10-190° C., 40-185° C., 50-180° C., or 60-175° C., particularly about 40-150° C. (for example 40-130° C.), more particularly about 60-140° C., even more particularly about 70-125° C., yet more particularly about 75-115° C.

Acid scavengers are particularly preferred stabilizers. Generally suitable is any scavenger that is capable of reacting with hydrogen halide, but does not interfere with subsequent utility of the polyisoolefin elastomer, or can be removed from the elastomer prior to eventual end use. Useful acid scavengers include, for example, alkali metal or alkaline earth metal carboxylates, epoxides, metal oxides, metal hydroxides inorganic salts of strong bases and weak acids or mixtures thereof.

For metal carboxylates, the metal portion of the metal carboxylate can be an alkali or alkaline earth metal. Thus, particularly suitable carboxylates are those of sodium, magnesium or calcium. The carboxylic acid from which the carboxylate is derived can be mono- or poly-carboxylic. Thus, suitable mono-carboxylic acids are the $C_4$ to $C_{20}$ mono-carboxylic acids such as caproic, caprylic, pelargonic, myristic, palmitic, oleic, stearic and 2-ethyl hexanoic acids. Also suitable is naphthenic acid. A particularly preferred metal carboxylate is calcium stearate (CaSt).

Suitable epoxides are the products formed by epoxidizing esters and glycerides of $C_8$-$C_{24}$ unsaturated fatty acids, for example esters found in soybean oil, castor oil, linseed oil, safflower oil, etc. Preferred specific polyethers of this class include epoxidized soybean oil (ESBO) and epoxidized linseed oil (sold under the trademarks Drapex™ 6.8 and Drapex™ 10.4, respectively). Other suitable epoxides are monomeric low molecular weight, e.g., $C_2$-$C_7$, monofunctional epoxides, such as ethylene epoxide, propylene epoxide, butylene epoxide, etc. Preferred low molecular weight monofunctional epoxides include ethylene epoxide, propylene epoxide and butylene epoxide. Also suitable are aryl substituted alkyl epoxide, for example 1,2-epoxyethylbenzene, i.e., styrene epoxide.

Metal oxides or hydroxides suitable as scavengers include those wherein the metal is selected from Group IIA of the Periodic Table. Particularly suitable are $Ca(OH)_2$, CaO, $Mg(OH)_2$, MgO, and hydrotalcite (e.g. Hycite™, DHT4A).

Suitable examples of inorganic salts of strong bases and weak acids include carbonates and bicarbonates of sodium, potassium and calcium.

As mentioned above, the acid-scavenger may also be added to the retentate as non-permeating solutions that are immiscible with the solution of polymer in the organic solvent. Preferable solutions are aqueous solutions of compounds that produce a pH>7 when dissolved in water, such as metal hydroxides, inorganic salts of weak acids and mixtures thereof. More preferred are metal hydroxides, carbonates and bicarbonates, wherein the metal is selected from Group IA of the periodic table.

The acid scavenger should be present in an amount which is effective to react with the hydrogen halide by-product formed during halogenation, taking into consideration reaction kinetics, e.g., temperature in the region in which the scavenger must react, the time available for the reaction compared to the potential for the acid halide to cause an undesirable side reaction (e.g. addition or degradation or isomerization), the use of additional means to remove hydrogen halide from the process (e.g., gas scrubbing, particularly in a process for halogenation of neat polymer), etc. Some limited experimentation, well within the skill of those in the art, will readily determine the effective amount of scavenger to be used in the particular circumstances at hand. As a general guide it will be recognized that in the absence of other means of removing hydrogen halide (e.g., gas scrubbing), one equivalent of scavenger is required at equilibrium per equivalent of hydrogen halide generated, but that as a practical matter up to about two to three times the theoretical amount can be used effectively. Where supplementary means are provided for hydrogen halide removal or where the effect of the hydrogen halide on the polymer is not particularly negative, as little as one-half or one-quarter the theoretical amount can be used effectively.

It is desirable that the molecular weight of the polyisoolefin polymer is relatively unchanged by the ultrafiltration process. The molecular weight decrease of polyisoolefin polymer following ultrafiltration is desirably less than 15%, more desirably less than 10%, even more desirably less than 5%. The choice of acid scavenger has been found to have an effect on molecular weight of the butyl polymer in the retentate. It is desirable to use a solid phase acid scavenger or a combination of a solid phase and liquid phase acid scavenger in order to reduce any tendency for molecular weight decrease due to ultrafiltration. In particular, use of a solid phase metal carboxylate has been found desirable. Combinations of a solid phase metal carboxylate and liquid phase metal oxide or hydroxide have been found particularly desirable.

In the ultrafiltration method, the unpurified polyisoolefin elastomer is provided in an organic solvent. The organic solvent may be the same solvent medium in which the unpurified polyisoolefin elastomer was produced, or the unpurified polyisoolefin elastomer may be separated from the original reaction medium and reconstituted in the same of different organic solvent. As choice for the organic solvents, it is possible to use all organic solvents and/or solvent mixtures in which the polyisoolefin elastomer and other components to be removed are homogeneously dissolved at >90 wt. % under the processing conditions. Solvents include all hydrocarbon aromatic and/or aliphatic solvents, halogenated solvents as well as cyclic ethers. Hexane, pentane, isohexane, isopentane, toluene, benzene, chlorobenzene, chloroform, methyl chloride, methylene chloride, tetrahydrofuran or mixtures of these solvents are preferred. Hexane, pentane, isohexane, isopentane are more preferred. Hexane is most preferred. The solution of unpurified polyisoolefin elastomer in an organic solvent may be referred to as cement.

A person skilled in the art would be able to identify suitable concentrations of unpurified polyisoolefin elastomer in the cement. The concentration may be in a range of about 1-30 wt. % of unpurified polyisoolefin elastomer in the solvent, more preferably 5-25 wt. %, yet more preferably about 10-22 wt. %, wherein 100 wt. % corresponds to the weight of elastomer and organic solvent.

The cement may optionally contain an aqueous phase. The water content may be in a range of about 1-60 wt. %, wherein 100 wt. % refers to the total weight of the solution (aqueous phase, organic solvent, elastomer). In one embodiment, the water content is in a range of about 1-40 wt. %, preferably about 2-20 wt. %, more preferably about 3-15 wt. %. In another embodiment the water content is in a range of about 20-60 wt. %, preferably about 40-60 wt. %, more preferably about 45-60 wt. %.

Herein, "unpurified polyisoolefin elastomers" is intended to mean all polyisoolefin elastomers which can be prepared by carbocationic polymerization and optionally subsequent halogenation, or other functionalization. Elastomers which are more than 90% soluble at a concentration of more than 2 wt. % in organic solvents and/or solvent mixtures are particularly preferred.

The term "purified polyisoolefin elastomers" is intended to mean the same groups of elastomers as for "unpurified polyisoolefin elastomers", the purified elastomers having an impurity level reduced to about 50%, preferably reduced to about 25%, more preferably reduced to about 10%, more preferably reduced to about 5% or more compared to the unpurified elastomers. Unpurified elastomers are generally used in a dissolved form and the purified elastomers are generally obtained in a dissolved form.

While the terms "unpurified polyisoolefin elastomers" and "purified polyisoolefin elastomers" are used herein, one skilled in the art recognizes that other components of being separated from the polyisoolefin elastomers may possess commercial utility and are therefore also considered products of the separation. Thus, while purification of the polyisoolefin elastomers is one goal of the separation, purification of other components, for example cyclic oligomers, is also a goal of the separation method.

Elastomers are preferably polyisoolefin copolymers, for example butyl polymers. Butyl polymers are generally derived from at least one isoolefin monomer, at least one multiolefin monomer and/or β-pinene, and optionally further copolymerizable monomers.

The butyl polymer is not limited to a special isoolefin. However, isoolefins within the range of from 4 to 16 carbon atoms, preferably 4-7 carbon atoms, such as isobutene, 2-methyl-1-butene, 3-methyl-1-butene, 2-methyl-2-butene, 4-methyl-1-pentene and mixtures thereof are preferred. More preferred is isobutene (isobutylene).

The butyl polymer is not limited to a special multiolefin. Every multiolefin copolymerizable with the isoolefin known by the skilled in the art can be used. However, multiolefins within the range of from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene and mixtures thereof, preferably conjugated dienes, are used. Isoprene is more preferably used. The butyl polymer useful in the present invention may include a co-monomer other than the above referenced multiolefins, such as an alkyl-substituted vinyl aromatic co-monomer, including but not limited to a $C_1$-$C_4$ alkyl substituted styrene, for example para-methylstyrene.

As optional monomers, any monomer copolymerizable with the isoolefins and/or dienes known by the skilled in the art can be used. α-methyl styrene, p-methyl styrene, chlorostyrene, cyclopentadiene and methylcyclopentadiene are preferably used. Indene and other styrene derivatives may also be used. β-pinene can also be used as a co-monomer for the isoolefin. The butyl polymer can include, for example, random copolymers of isobutylene, isoprene and paramethyl styrene.

Preferably, the monomer mixture comprises from about 80% to about 99% by weight of an isoolefin monomer and from about 1% to 20% by weight of a multiolefin and/or β-pinene monomer. More preferably, the monomer mixture comprises from about 85% to about 99% by weight of an isoolefin monomer and from about 1% to 15% by weight of a multiolefin monomer. If the monomer mixture comprises the optional monomer copolymerizable with the isoolefins and/or dienes, the monomer mixture preferably comprises from about 80% to about 99% by weight of a monomer, from about 0.5% to about 5% by weight of a multiolefin monomer and from about 0.5% to about 15% by weight of the optional monomer. More preferably, the monomer mixture comprises from about 85% to about 99% by weight of an isoolefin monomer, from about 0.5% to about 5% by weight of a multiolefin monomer and from about 0.5% to about 10% by weight of the optional monomer.

The butyl polymer can then be subjected to a halogenation process in order to produce a halobutyl polymer. Bromination or chlorination can be performed according to the process known by those skilled in the art, for example, the procedures described in Rubber Technology, 3rd Ed., Edited by Maurice Morton, Kluwer Academic Publishers, pp. 297-300 and further documents cited therein.

During halogenation of a butyl polymer containing conjugated dienes, such as isoprene, some or all of the multiolefin content of the butyl polymer is converted to allylic halides. The total allylic halide content of the halobutyl polymer may not exceed the starting multiolefin content of the parent butyl polymer. The allylic halide sites allow for reacting with and attaching a nucleophile to the halobutyl polymer. For halobutyl polymers containing no allylic halides, for example, halobutyl polymers derived from isobutylene and styrenic monomers, benzylic halides, formed by halogenation of the styrenic monomer, may be reacted to form the ionomer rather than allylic halides. The same logic would therefore apply to benzylic halides as allylic halides; the total amount of ionomeric moieties cannot exceed the available amount of benzylic halides.

The ultrafiltered polyisoolefin elastomer solution (retentate) produced in the method herein may be subject to degassing and spray drying or coagulation in water with subsequent drying, dry finishing, as a powder, crumbs or in bale form with an impurity level which is up to 99 wt. % less than the impurity level in relation to the unpurified elastomer. Other drying methods such as boiling down, film evaporation or freeze drying are also possible.

Optionally, in the case of purified halobutyl polymer, allylic halide or benzylic halide sites of the halobutyl polymer may be reacted with at least one nitrogen or phosphorus containing nucleophile to form a butyl ionomer. The nitrogen or phosphorus containing nucleophile may have the following formula,

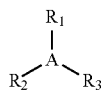

wherein:
A is a nitrogen or phosphorus; and,
R1, R2 and R3 are selected from the group consisting of linear or branched $C_1$-$C_{18}$ alkyl substituents, an aryl substituent which is monocyclic or composed of fused $C_4$-$C_8$ rings, and/or a hetero atom selected from, for example, B, N, O, Si, P, and S.

In general, the appropriate nucleophile will contain at least one neutral nitrogen or phosphorus center which possesses a lone pair of electrons which is both electronically and sterically accessible for participation in nucleophilic substitution reactions. Suitable nucleophiles include trimethylamine, triethylamine, triisopropylamine, tri-n-butylamine, trimethylphosphine, triethylphosphine, triisopropylphosphine, tri-n-butylphosphine, triphenylphosphine 2-dimethylaminoethanol, 1-dimethylamino-2-propanol, 2-(isopropylamino)ethanol, 3-dimethylamino-1-propanol, N-methyldiethanolamine, 2-(diethylamino)ethanol, 2-dimethylamino-2-methyl-1-propanol, 2-[2-(dimethylamino) ethoxy]ethanol, 4-(dimethylamino)-1-butanol, N-ethyldiethanolamine, triethanolamine, 3-diethylamino-1-propanol, 3-(diethylamino)-1,2-propanediol, 2-{[2-(dimethylamino) ethyl]methylamino}ethanol, 4-diethylamino-2-butyn-1-ol, 2-(diisopropylamino)ethanol, N-butyldiethanolamine, N-tert-butyldiethanolamine, 2-(methylphenylamino)ethanol, 3-(dimethylamino)benzyl alcohol, 2-[4-(dimethylamino)phenyl]ethanol, 2-(N-ethylanilino)ethanol, N-benzyl-N-methylethanolamine, N-phenyldiethanolamine, 2-(dibutylamino)ethanol, 2-(N-ethyl-N-m-toluidino)ethanol, 2,2'-(4-methylphenylimino)diethanol, tris[2-(2-methoxyethoxy)ethyl]amine, and 3-(dibenzylamino)-1-propanol and mixtures thereof.

The amount of nucleophile reacted with the butyl polymer may be in the range of from 0.05 to 5 molar equivalents, more preferably 0.5 to 4 molar equivalents and even more preferably 1 to 3 molar equivalents based on the total molar amount of allylic or benzylic halide present in the halobutyl polymer.

The halobutyl polymer and the nucleophile can be reacted for about 0.5 to 90 minutes. When the reaction takes place in an extruder, the reaction is preferably from 10 to 120 seconds minutes, more preferably from 20 to 60 seconds. When the reaction takes place in an internal mixer, the reaction is preferably from 1 to 15 minutes, more preferably from 1 to 4 minutes. In other cases, the reaction takes considerably longer, for example from greater than 15 to 90 minutes, preferably 20 to 60 minutes. A temperature range of 80 to 200° C. is desirable.

As stated above, the nucleophile reacts with the allylic or benzylic halide functionality of the halobutyl polymer resulting in units of ionomeric moieties where the allylic or benzylic halide functionality existed on the halobutyl polymer. The total content of ionomeric moiety in the butyl ionomer may not exceed the starting amount of allylic or benzylic halide in the halobutyl polymer; however, residual allylic halides, benzylic halides and/or residual multiolefins may be present. In embodiments of the present invention where substantially all of the allylic or benzylic halides sites are reacted with the nucleophile, a butyl ionomer is formed. In embodiments where less than all the allylic or benzylic halide sites are reacted with the nucleophile, a partially halogenated butyl ionomer is formed.

The butyl ionomer can be prepared from a halogenated butyl polymer having from 1.2 to 2.2 mol % of the multiolefin monomer. Additionally, the ionomer can be prepared from a halogenated butyl polymer having a higher multiolefin content, for example greater than 2.5 mol %, preferably greater than 3.5 mol %, more preferably greater than 4.0 mol %. The preparation of a suitable high multiolefin butyl polymer is described in Canadian patent application CA 2,418,884, which is incorporated herein by reference.

The resulting ionomers preferably possess at least 0.5 mol %, preferably at least 0.75 mol %, more preferably at least 1.0 mol %, yet more preferably at least 1.5 mol % of the ionomeric moiety. Residual allylic halides may be present in an amount of from 0.1 mol % up to an amount not exceeding the original allylic halide content of the halobutyl polymer used to produce the butyl ionomer. Residual multiolefin may be present in an amount of from 0.1 mol % up to an amount not exceeding the original multiolefin content of the butyl polymer used to produce the halobutyl polymer. Typically, the residual multiolefin content of the ionomer is at least 0.4 mol %, preferably at least 0.6 mol %, more preferably at least 1.0 mol %, yet more preferably at least 2.0 mol %, still more preferably at least 3.0 mol %, even more preferably at least 4.0 mol %.

The purified polyisoolefin in the retentate, whether or not subjected to halogenation or ionomer formation processes, may be re-inforced with a suitable filler to enhance certain desirable physical properties, such as tensile strength, viscosity, hardness, permeability, etc. Suitable fillers are selected from those that do not impart undesirable residues or otherwise adversely affect the polyisoolefin for use in the aforementioned "clean" applications. Examples of suitable fillers include silica, silicates, high aspect ratio or nano-sized versions thereof, and other suitable clean fillers. The selection of filler for imparting desired physical properties while retaining clean characteristics is within the purview of persons skilled in the art.

In another embodiment, the purified polyisoolefin elastomer or ionomer thereof may be cured by any suitable method, for example sulfur-based curatives, peroxide-based curatives, ZnO curatives, resin cure systems or UV light. A typical sulfur-based curing system comprises: (i) a metal oxide, (ii) elemental sulfur and (iii) at least one sulfur-based accelerator. The use of metal oxides as a component in the curing system is well known in the art. A suitable metal oxide is zinc oxide, which is typically used in the amount of from about 1 to about 10, preferably from about 2 to about 5, parts by weight per hundred parts by weight polymer in the composition. Elemental sulfur, comprising component (ii) of the preferred curing system is typically used in amounts of from about 0.2 to about 10 parts by weight per hundred parts by weight polymer in the composition. Suitable sulfur-based accelerators (component (iii) of the preferred curing system) are typically used in amounts of from about 0.5 to about 3 parts by weight, per hundred parts by weight polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). Preferably, the sulphur based accelerator is mercaptobenzothiazyl disulfide. In some embodiments of a resin cure system, the resin cure system may comprise a halogenated phenol formaldehyde resin or a phenol formaldehyde resin, optionally in conjunction with an activator. Halogenated phenol formaldehyde resins and phenol formaldehyde resins are known in the art as described in U.S. Pat. Nos. 2,701,895, 3,093,613 and 3,165,496, which are herein incorporated by reference. An alkyl phenol-formaldehyde derivative, for example octylphenol-formaldehyde with methylol active group, is typical. Metal oxides, for example zinc oxide, and/or other curing or processing aids (e.g. stearic acid) may also be used in the resin cure system. Metal oxides may be used in the amount of from about 1 to about 10 parts by weight per hundred parts by weight polymer in the composition. Resin may be used in amounts of from about 0.2 to about 10 parts by weight per hundred parts by weight polymer in the composition. Other curing or processing aids may be used in amounts of from about 0.2 to about 3 parts by weight, per hundred parts by weight polymer in the composition.

The cured article may contain further auxiliary products for polymers (e.g. rubbers), such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts that depend, inter alia, on the intended use. The cured article may also contain mineral and/or non-mineral fillers. Conventional amounts are from 0.1 to 50 wt %, based on rubber. Further information on vulcanization processes may be obtained in Encyclopedia of Polymer Science and Engineering, Vol. 17, s. 666 et seq. (Vulcanization).

The purified polyisoolefin and the cured article may be used as components of pharmaceutical containers, such as closures for parenteral (I.V.) vials, closures for injection vials, closures for vials containing freeze dried pharmaceutical products, closures for blood collection tubes or other diagnostic tubes, plungers and plunger tips for syringes, discs and gaskets, intravenous drug delivery components and like applications. Additionally, purified polyisoolefin and the cured article may be used in medical devices, objects with food and drink contact, such as seals and gaskets in bottle caps, objects or components of objects used in cell and tissue culture. Further, the purified polyisoolefin may be used as an elastomer in gum base in the production of chewing gum.

While one result of the present method is the purification of the polyisoolefin elastomer to reduce the content of oligomers, e.g. cyclic oligomers, therein, another important result is that the oligomers are also purified and may be subsequently used for various applications. In the production of butyl rubber, $C_{13}$ (1-isopropenyl-2,2,4,4-tetramethylcyclohexane, $C_{13}H_{24}$) and $C_{21}$ (1,1,5,5-tetramethyl-2-(1-methylethenyl)-3-(2,2,4-trimethylpentyl)-cyclohexane, $C_{21}H_{40}$) cyclic oligomers having the following structures are produced:

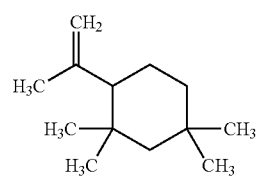

C13

-continued

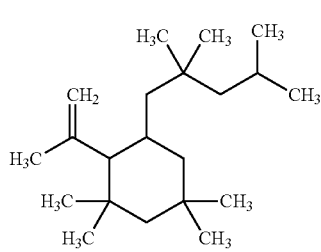

C21

These cyclic oligomers are unsaturated. As described in US 2003/0216264, the entire contents of which is herein incorporated by reference, saturated substituted cyclohexane derivatives that are useful as lubricants and traction fluids may be produced via hydrogenation of respective unsaturated precursors (oligomers). These unsaturated precursors are the cyclic oligomers formed during the production of the polyisoolefin elastomers. The majority of these oligomers remain in the finished rubber product, although they do not serve a specific purpose. The present method is therefore also a process for the simultaneous production of oligomer-depleted high-molecular weight polyisoolefin elastomer and butyl-rubber-free oligomers that are useful as precursors for lubricants and traction fluids. The cyclic oligomers may also be halogenated.

In the process for curing polyisoolefin copolymer the oligomer content may be reduced to 250 ppm or less by any suitable method including filtration methods, for example the ultrafiltration method described above, precipitation methods, alteration of process parameters during polymerization in the production of the polyisoolefin copolymer or any combination thereof. Alteration of process parameters to reduce oligomer content may include, for example, the use of a hydrofluorinated olefin (e.g. 2,3,3,3-tetrafluoro-1-propene) as a polymerization diluent, as described in U.S. Provisional Patent application Ser. No. 61/794,289 which is herein incorporated by reference.

When the polyisoolefin elastomer is cured by a resin cure system in the presence of 900 ppm or less of oligomers, an increase in cure state of at least about 5% may be achieved compared to the cure state of a polyisoolefin elastomer cured with the same amount of the same cure system but in the presence of more than 900 ppm of oligomers. Increases in cure state of at least about 8%, or at least about 12% or at least about 15% or at least about 17% may be achieved. As a result, reducing oligomer content to 900 ppm or less permits using less curative to obtain a cured polyisoolefin elastomer having substantially the same physical properties as a polyisoolefin elastomer cured with the same cure system when the polyisoolefin elastomer is in a mixture with more than 900 ppm of oligomers. The amount of cure system used may be up to about 50% less, or up to about 40% less, or up to about 35% less than the amount used when the oligomer content is more than 900 ppm.

EXAMPLES

Examples 1-12—Purification

Polyisoolefin Properties

The polyisoolefin used was butyl rubber, a copolymer of isobutylene and isoprene (IIR). The IIR had a multiolefin content of 1.8 wt % and a Mooney viscosity (ML(1+8) @ 125° C.) of 51. Halogenated butyl rubber comprised brominated butyl rubber (BrIIR) having a bromine content of 1.8 wt % and a Mooney viscosity (ML(1+8) @ 125° C.) of 32.

Characterization of Butyl Rubber

Molecular weights were determined by gel permeation chromatography in tetrahydrofurane and reported in kg $mol^{-1}$. Calcium and total bromine content was measured by X-ray fluorescence, and results are reported in ppm and wt. %, respectively. Calcium stearate (CaSt) and epoxidized soybean oil (ESBO) contents were determined from infrared spectra, and results are reported in wt. %. The content of sterically hindered phenolic anti-oxidant (Irganox™ 1010) was determined by HPLC, results are reported in wt. %. Microstructure was determined of respective signals from $^1$H NMR spectra of the elastomers, and results for the exo-Br and rearranged allylic halide units are reported in mol %.

Quantification of Oligomers in Butyl Rubber

An aliquot of butyl rubber is dissolved in hexane (about 12 wt. % or less). Then acetone is added to the solution (same volume than hexane), which leads to the precipitation of the elastomer. The supernatant is then decanted from the precipitate and filtered. The oligomer concentration is then determined by gas chromatography using dodecane and eicosane as standards. The oligomer level in butyl rubber is calculated from the concentration determined by gas chromatography (GC) as ratio between total oligomer mass and total elastomer mass in a given sample and reported as parts per million (ppm) in the following.

Constant Volume Diafiltration

Constant volume diafiltration was performed on a membrane filtration setup acquired from Evonik—Membrane Extraction Technology. This setup consists of a holding tank from which a butyl rubber solution was recirculated over the filtration membranes via a gear pump. The retentate loop was pressurized to a selected pressure with nitrogen by a pressure regulator. Hexane was added to the holding tank via an HPLC pump with the same rate than permeate flow. The permeate line was open to atmospheric pressure. Permeate collection took place on a scale.

The membranes used were either two cells containing disks of flat-sheet membranes, (wherein each cell had an active membrane area of 51 cm$^2$ with an EMET PuraMemS600™ membrane installed), or a housing for a tubular ceramic membrane (ATECH Innovation GmbH, 10 mm outer diameter, 6 mm inner diameter, 50 cm length, 5 kDa molecular weight cut-off).

The collection scale was shielded from air flow with a transparent box and connected to a computer for data logging using the BalanceLink™ software (Mettler Toledo).

In constant volume diafiltration examples the amount of permeate generated is expressed as the fraction between the volume of the permeate at the end and the volume of the retentate at the beginning. This ratio is also known as the diafiltration coefficient D.

Concentration Via Ultrafiltration

This experiment was carried out identical to constant volume diafiltrations, however, the addition of fresh solvent was omitted leading to an increase of elastomer concentration as solvent permeates.

Examples 1 and 2

Constant volume diafiltration was performed to separate butyl rubber from cyclic oligomers. For Examples 1 and 2, a stock solution was prepared by dissolving 120 g of BrIIR in 700 g hexanes.

For Example 1, an aliquot of the solution was subjected to steam coagulation and mill-drying. The resulting elastomer had an oligomer content of 1690 ppm.

For Example 2, an aliquot of the stock solution (54 g BrIIR, 315 g hexane, 541 mL retentate volume at beginning) was subjected to constant volume diafiltration using a flat-sheet PuraMemS600™ membrane (102 cm² membrane area, permeate flow was between 0.5 to 0.6 mL/min) over 30 hours at a transmembrane pressure of 10 to 14 bar. A total of 660 g permeate (1010 mL) was collected (diafiltration coefficient of 2.1). Then the retentate solution was subjected to steam coagulation and mill-drying. The resulting elastomer had an oligomer content of 431 ppm. Table 1 shows the results.

TABLE 1

|  | Example 1 | Example 2 |
| --- | --- | --- |
| Total oligomers | 1690 | 431 |
| ppm Ca | 1135 | 1146 |
| wt. % CaSt | 2.84 | 2.77 |
| wt. % ESBO | 1.28 | 0.80 |
| wt. % Irganox ™ 1010 | 0.0350 | 0.0020 |
| $M_n$ [kg mol$^{-1}$] | 165 | 136 |
| $M_w$ [kg mol$^{-1}$] | 498 | 432 |
| $M_z$ [kg mol$^{-1}$] | 1042 | 888 |
| mol % exo-Br | 0.75 | 0.73 |
| mol % CH$_2$—Br | 0.12 | 0.14 |

Comparing Example 1 to Example 2, it can be seen that the diafiltration resulted in a dramatic reduction in total oligomers in the butyl rubber, while maintaining almost the same levels of calcium stearate (CaSt).

Examples 3 and 4

Examples 1 and 2 were used as base elastomers and used for the compounding of a typical pharmastopper formulation according to Table 2. MDR data (according to ASTM D5289) for these compounds at 160° C. is shown in Table 3.

TABLE 2

| Ingredient | Example 3 | Example 4 |
| --- | --- | --- |
| Example 1 | 100 | 0 |
| Example 2 | 0 | 100 |
| Polyethylene AC-617A | 5 | 5 |
| Polyfil 80 | 80 | 80 |
| Zinc-dibenzyl-dithiocarbamate | 1.5 | 1.5 |
| Zinc oxide (KADOX ™ 920) Grade PC 216 | 3 | 3 |

TABLE 3

|  | Example 3 | Example 4 |
| --- | --- | --- |
| $M_L$ [dNm] | 2.34 | 2.05 |
| $M_H$ [dNm] | 7.79 | 6.99 |
| $M_H - M_L$ [dNm] | 5.45 | 4.94 |
| $t_{s2}$ [min] | 1.14 | 1.05 |
| $t_{c90}$ [min] | 2.1 | 1.82 |

$M_L$ for Example 4 is lower than that for Example 3. Hence improved processability characteristics are anticipated for the compound from the lower-molecular weight elastomer. Examples 3 and 4 were furthermore cured at 160° C. for 7 min. 3 g of the cured elastomer was then subjected to Soxhlet extractions in isopropanol (276 and 254 mL, respectively) for 9 and 10 h, respectively. The concentration of oligomers in the extract was determined from GC. These results showed that in Example 3 and 4, 315 and 106 ppm of the mass of rubber ended up as extracted oligomers in the isopropanol phase. Hence the compound prepared from the purified elastomer also shows a lower level of extractables.

Examples 5 and 6

BrIIR and IIR were dissolved in hexane and subjected to constant volume diafiltration experiments using a ceramic single channel membrane with a membrane area of 89 cm² according to conditions summarized in Table 4 at a transmembrane pressure of 4 bar.

TABLE 4

|  | Example 5 | Example 6 |
| --- | --- | --- |
| Starting elastomer | BrIIR | IIR |
| $y_{IIR,start}$ [wt. %] | 11.6% | 10.2% |
| $y_{IIR,end}$ [wt. %] | 11.6% | 10.2% |
| D | 2.06 | 2.94 |
| $T_{retentate}$ [° C.] | 20-30° C. | 20-30° C. |
| Crossflow velocity m/s | ~0.6 | ~0.6 |
| Permeate flux, L/m² h | 8.5 | 9.0 |
| wt. % ESBO, start | 1.16 | n.d. |
| wt. % ESBO, end | 0.39 | n.d. |
| wt. % CaSt, start | 2.51 | 1.12 |
| wt. % CaSt, end | 2.71 | 1.08 |
| wt. % Irg.1010, start | 0.0353 | 0.0424 |
| wt. % Irg. 1010, end | 0.0042 | 0.0014 |
| ppm Oligomers, start | 1827 | 1737 |
| ppm Oligomers, end | 259 | 101 |
| Mn, start | 145 | 165 |
| Mn, end | 146 | 167 |
| Mw, start | 525 | 618 |
| Mw, end | 491 | 543 |
| Mz, start | 1149 | 1215 |
| Mz, end | 1058 | 1023 |

In Example 5 the oligomers were depleted from 1827 to 259 ppm, thus a reduction to 14% from the start of the experiment. Without wishing to be bound by theory, this is in excellent agreement with the theoretical level of oligomers assuming a rejection coefficient of 0, thus exp(−2.06)=13%.

In Example 6 the oligomers were depleted from 1737 to 101 ppm, thus a reduction to 6% from the start of the experiment. Without wishing to be bound by theory, this is in excellent agreement with the theoretical level of oligomers assuming a rejection coefficient of 0, thus exp(−2.94)=5%.

Examples 7 and 8

Solutions of BrIIR (Example 7) and IIR (Example 8) were prepared and then subjected to concentration via ultrafiltration using the ceramic membrane described above. Aliquots of the stock solution were dried and subjected to characterization via IR, HPLC, GC, GPC and NMR. Then, the retentate was concentrated until the retentate volume was reduced to 42 and 43% of the starting volume by generation of permeate at 4 bar transmembrane pressure, 20 to 35° C. retentate temperature, and a permeate flux of 9 L/m²h. The concentrated retentate was dried and also subjected to characterization. Values for calcium stearate, ESBO, Irganox™ 1010 and oligomer content of the dried elastomers are stated in Table 5. Table 5 shows that the level of calcium stearate in dried elastomer is unaffected by the ultrafiltration, however, the level of oligomers, ESBO and Irganox™ 1010 is decreased. Thus ESBO and Irganox™ 1010 permeate the membrane together with solvent and oligomers.

TABLE 5

|  | Example 7 | Example 8 |
|---|---|---|
| Elastomer | BrIIR | IIR |
| $y_{IIR,start}$ [wt. %] | 6.2% | 5.0% |
| $y_{IIR,end}$ [wt. %] | 13.8% | 11.0% |
| wt. % CaSt, start | 2.56 | 0.97 |
| wt. % CaSt, end | 2.57 | 0.95 |
| wt. % ESBO, start | 1.18 | 0 |
| wt. % ESBO, end | 0.62 | 0 |
| wt. % Irg.1010, start | 0.036 | 0.044 |
| wt. % Irg. 1010, end | 0.019 | 0.018 |
| ppm Oligomers, start | 2123 | 1588 |
| ppm Oligomers, end | 873 | 710 |

Examples 9-12

These examples were carried out on an ultrafiltration (UF) setup where the holding tank for retentate and feed can be heated. Flux measurements were performed at temperatures between 90 to 105° C. at various crossflow velocities at 6 bar transmembrane pressure. In these examples an ATECH 1/6 ceramic membrane with 5 kDa MWCO of 25 cm length was used. For Examples 9 and 10, calcium stearate was removed from the rubber stock prior to the UF experiment via centrifugation. In Example 11 aqueous sodium hydroxide was added to the retentate. Experimental parameters are summarized in Table 6. The retentate temperature during these examples is shown in FIG. 1 and ranged from 90 to 105° C. during the flux measurements.

TABLE 6

|  | Example | | | |
|---|---|---|---|---|
|  | 9 | 10 | 11 | 12 |
| m(Elastomer + hexane)/g | 2147 | 2226 | 2308 | 2025 |
| m(aq. NaOH 1 wt. %)/g | 0 | 0 | 0 | 87 |
| $V_{ret,end}/V_{ret,0}$ | 0.91 | 0.89 | 0.89 | 0.91 |
| $y_{IIR,start}$ | 11.5% | 18.4% | 20.4% | 24.8% |
| $y_{IIR,end}$ | 12.1% | 20.8% | 22.5% | 26.0% |
| Calcium stearate | >90% removed | >90% removed | Present | Present |
| ppm Ca, start | 76 | 101 | 1170 | 1197 |
| ppm Ca, end | 56 | 102 | 1173 | 962 |
| wt. % CaSt, start (±0.6 wt. %) | n.d. | n.d. | 2.87 | 2.83 |
| wt. % CaSt, end | n.d. | n.d. | 2.76 | 3.12 |
| wt. % ESBO, start (±0.033 wt. %) | 2.03 | 1.78 | 1.17 | 1.05 |
| wt. % ESBO, end | 1.70 | 1.32 | 0.92 | 0.85 |

Table 7 shows molecular weight and microstructure properties before and after the UF experiment. Table 8 shows flux data that was measured during experiments Example 9 through Example 12. Furthermore, for each set of operating conditions ($y_{IIR}$, and $v_{CF}$) the unitless parameter α was calculated as a gauge for the efficiency of a specific set of process conditions in accordance with Equation 1.

$$\alpha = \frac{y_{IIR} J}{v_{CF}} \quad \text{Equation 1}$$

Figure 2:
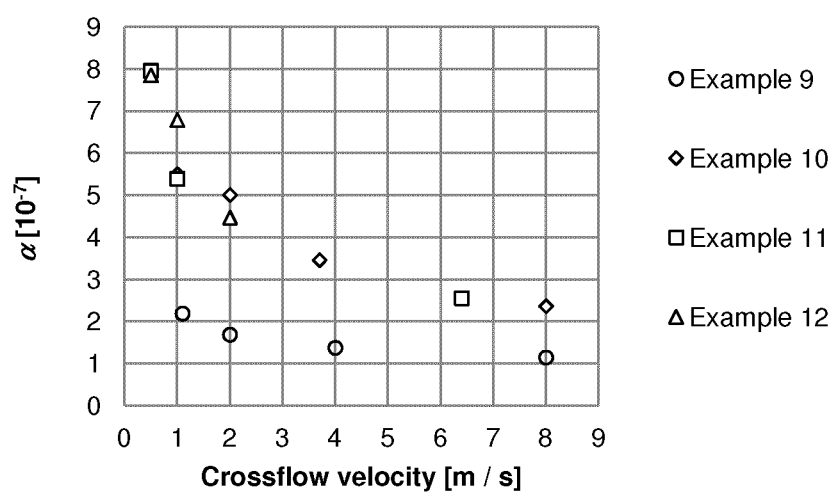
FIG. 2 depicts a graph of parameter $\alpha$ as a function of crossflow velocity for Examples 9-12.

In a UF process, it is desirable to achieve operation at high concentration or at a high flux, hence the values $y_{IIR}$ and J are in the numerator of α. Maintaining a high crossflow velocity is undesirable, as it requires energy, hence $v_{CF}$ is put into the denominator. α values for each set of operating conditions is also summarized in Table 8 and FIG. 2.

TABLE 7

|  | Example | | | |
|---|---|---|---|---|
|  | 9 | 10 | 11 | 12 |
| Mn, start | 140 | 142 | 134 | 153 |
| Mn, end | 133 | 132 | 133 | 152 |
| Mn, end/Mn, start | 95% | 93% | 99% | 99% |
| Mw, start | 435 | 447 | 447 | 514 |
| Mw, end | 419 | 421 | 427 | 514 |
| Mw, end/Mw, start | 96% | 94% | 96% | 100% |
| Mz, start | 854 | 884 | 889 | 1017 |
| Mz, end | 837 | 846 | 827 | 1014 |
| Mz, end/Mz, start | 98% | 96% | 93% | 100% |
| mol % exo-Br, start | 0.78 | 0.76 | 0.76 | 0.72 |
| mol % exo-Br, end | 0.67 | 0.60 | 0.76 | 0.72 |
| mol % CH2—Br, start | 0.06 | 0.09 | 0.12 | 0.14 |
| mol % CH2—Br, end | 0.15 | 0.21 | 0.15 | 0.13 |

Examples 9 and 10 only contained the soluble acid scavenger ESBO. In these examples a decrease in molecular weights is observed as a result of the ultrafiltration process. Also, the microstructure of the polymer changes, mol % exo-Br decreases and mol % $CH_2$—Br increases, which is undesirable as this is known to increase the scorch of the elastomer. In Example 11 changes in the molecular weight and microstructure are less pronounced. This is consistent with calcium stearate providing stability during the ultrafiltration process. Example 12 further contains aqueous NaOH as additional acid scavenger. In Example 12 no change in molecular weight and microstructure is observed at all.

TABLE 8

| Example | $y_{IIR}$ [wt. %] | Crossflow velocity $V_{CF}$ [m/s] | Permeate flux J [L/m²h] | α [10⁻⁷] |
|---|---|---|---|---|
| 9a | 11.8 ± 0.3 | 1.1 | 7.3 ± 0.2 | 2.2 |
| 9b | 11.8 ± 0.3 | 2.0 | 10.3 ± 0.6 | 1.7 |
| 9c | 11.8 ± 0.3 | 4.0 | 16.8 ± 0.3 | 1.4 |
| 9d | 11.8 ± 0.3 | 8.0 | 28.0 ± 0.8 | 1.1 |
| 10a | 19.6 ± 1.2 | 1.0 | 10.1 ± 0.0 | 5.5 |
| 10b | 19.6 ± 1.2 | 2.0 | 18.4 ± 0.5 | 5.0 |
| 10c | 19.6 ± 1.2 | 3.7 | 23.7 ± 0.7 | 3.5 |
| 10d | 19.6 ± 1.2 | 8.0 | 34.7 ± 0.8 | 2.4 |
| 11a | 21.5 ± 1.1 | 0.5 | 6.8 ± 0.1 | 8.0 |
| 11b | 21.5 ± 1.1 | 2.0 | 18.1 ± 0.3 | 5.4 |
| 11c | 21.5 ± 1.1 | 6.4 | 27.5 ± 0.0 | 2.6 |
| 12a | 25.4 ± 0.6 | 0.5 | 5.7 ± 0.2 | 7.8 |
| 12b | 25.4 ± 0.6 | 1.0 | 9.6 ± 0.0 | 6.8 |
| 12c | 25.4 ± 0.6 | 2.0 | 12.7 ± 0.4 | 4.5 |

Figure 3:
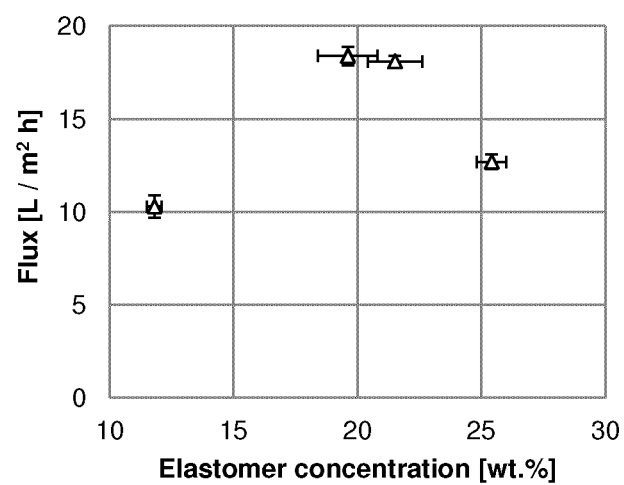
FIG. 3 depicts a graph showing flux data points for flux measured at 2 m/s for different elastomer concentrations.

It is desirable to operate an ultrafiltration process with the minimum amount of resources (i.e. solvent and energy). Thus, at high concentration and low crossflow velocities while still achieving a high flux. These conditions are summarized in the parameter α. As seen in FIG. 3, the flux surprisingly and unexpectedly shows a maximum at elastomer concentration of around 20 wt. %. Since surprisingly the flux increases with increasing elastomer concentration, the ultrafiltration of butyl rubber in hexane gives high values for α at high elastomer concentrations. It is further surprising, that it is possible to run the process such that the acid scavengers and process aids calcium stearate and/or aqueous sodium hydroxide do not permeate. For example 12a, the permeate was clear and single homogenous phase indicating that the aqueous phase did not permeate the membrane. Thus, it is possible to deplete oligomers while maintaining a constant level of a solid acid scavenger or liquid acid scavenger dissolved in water.

Examples 13-25—Resin Curing

Materials

Two different batches of commercial LANXESS X_Butyl BB 2030 (Com. Batch 1 and Com. Batch 2) were used as reference and starting materials.

LANXESS X_Butyl BB 2030 (Com. Batch 1) was purified using ultrafiltration on the pilot scale using an ATECH 19/6 5 kDa ceramic membrane to produce three purified experimental butyl rubber elastomers, UF-34%, UF-20% and UF-8%, having cyclic oligomer contents that were 34%, 20% and 8%, respectively, of the cyclic oligomer content of the unpurified Com. Batch 1.

LANXESS Bromobutyl 2030 (Com. Batch 2) was purified as described below using a precipitation method to produce two purified experimental butyl rubber elastomers, Prec.-2% and Prec.-3%, having 2% and 3%, respectively, of the cyclic oligomer content of the unpurified Com. Batch 2.

Another control elastomer was prepared from Com. Batch 2 that was dissolved and finished in the lab (Lab-Control).

Procedures for the preparation of the lab-scale samples are summarized in the following.

Prec.-2%.

163 g Com. Batch 2 was dissolved in 1314 g hexanes. After complete dissolution, about the same volume of acetone was added, upon which the elastomer precipitated. The precipitate was decanted and redissolved in 1041 g hexanes. Again, after complete dissolution, about the same volume of acetone was added, upon which the elastomer precipitated. The bulk of the solvent-laden material was dissolved in 630 g hexane. 1.828 g epoxidized soybean oil (SDB Cizer E-03) and 99 mg Irganox™ 1010 was added to the solution. Finally, the solution was steam coagulated and mill-dried to constant weight. This material had a volatile content of 1.16 wt %, which was considered too high for compounding. Thus, the material was dried further to constant weight prior to compounding.

Prec.-3%.

300 g Com. Batch 2 was dissolved in 1718 g hexanes. After complete dissolution, about the same volume of acetone was added, upon which the elastomer precipitated. The precipitate was decanted and redissolved in 1662 g hexanes. Again, after complete dissolution, about the same volume of acetone was added, upon which the elastomer precipitated. The bulk of the solvent-laden material was dissolved in 1160 g hexane. 3.365 g epoxidized soybean oil (SDB Cizer E-03) and 150 mg Irganox™ 1010 was added to the solution. Finally, the solution was steam coagulated and mill-dried.

Lab-Control.

300 g Com. Batch 2 was dissolved in 1718 g hexanes. After complete dissolution, the solution was steam coagulated and mill-dried to constant weight.

Compounding and Testing

The purified samples and respective control samples were compounded based on a model pharmaceutical closure formulation. Compounds were prepared on a Brabender mixer with Banbury rotors (capacity 75 mL). The compound composition comprised elastomer (100 phr), white filler (Polyfil™ 80, 85 phr), polyethylene wax (Polyethylene AC-617A, 2 phr), and a resin cure system comprising zinc oxide (ZOCO 104, 3 phr), heat reactive octylphenol-formaldehyde resin (SP-1045, 1.5 phr), and stearic acid (triple pressed, 0.75 phr). Mixing was performed at 60 rpm and 60° C. starting temperature. About ¾ of the elastomer was added, and after 1 min, Polyfil™ 80 and Polyethylene AC-617A were added with the remainder of elastomer. Sweeping was performed at 3 min, and addition of curatives was done at 4 min. After 6 min of mixing time, the compound was dumped and finally refined on a mill. The compounds were cured at 160° C.

Elastomer testing included MDR, stress-strain, compression set, permeability to oxygen in compliance with respective ASTM standards.

Results

Table 9 provides a table with the formulations of the purified samples and their respective control samples. Table 10 provides a table with the compound and vulcanizate properties of the compounds in the table in Table 9. As seen in Table 9 and Table 10, purification impacts the oligomer level in the elastomer significantly. As evidence by Examples 18 and 22-25, two precipitations remove almost all oligomers. As evidenced by Examples 14-16, ultrafiltration also reduces oligomer level dramatically, but can be done in a controlled manner to fine tune the oligomer level.

In addition, it was found that purification does not significantly impact microstructure and calcium content, and that molecular weight ($M_w$ and $M_z$) are also virtually constant throughout the series of elastomers investigated. $M_n$ increases by 23-34 kg mol$^{-1}$ upon precipitation, which is also reflected in an increase in Mooney viscosity from 31/32 to 35.

Figure 4A:
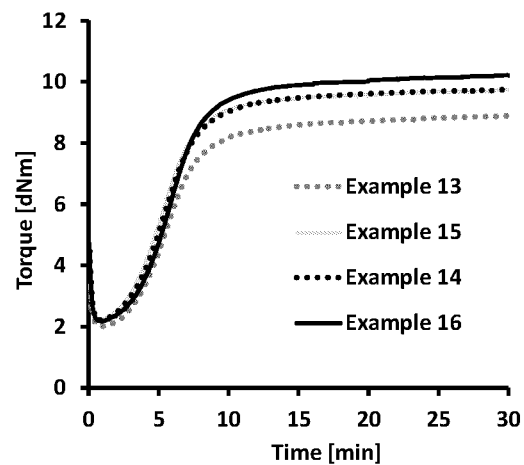
FIG. 4 depicts MDR curves of compounds based on ultrafiltration purified BB 2030 (FIG. 4A), BB 2030 purified by precipitation to a level of 2% of original oligomer content (FIG. 4B) and BB 2030 purified by precipitation to a level of 3% of original oligomer content (FIG. 4C).
Figure 4B:
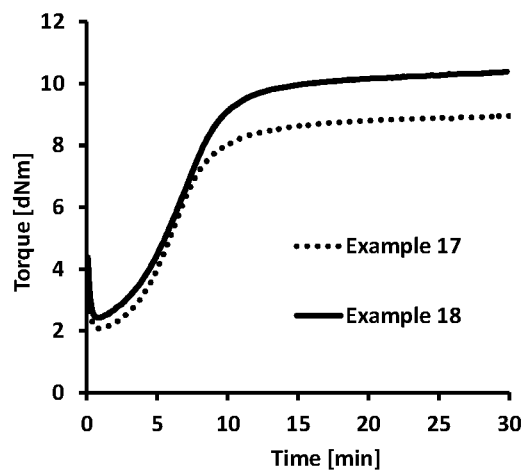
Figure 4C:
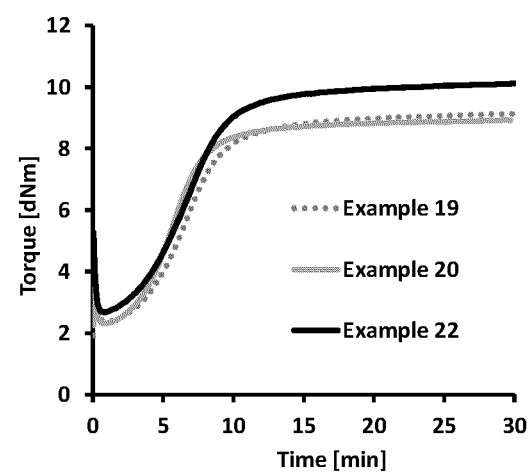

Table 10, FIG. 4A, FIG. 4B and FIG. 4C highlight that purification impacts the state of cure. The starting BB 2030 used for ultrafiltration (UF) purified samples had an oligomer content of 2200 ppm and showed a $\Delta M$ ($M_H$–$M_L$) of 6.85 dNm. After ultrafiltration, the purified material shows $\Delta M$ of 7.51 to 8.04 dNm, thus an increase of up to 1.4 dNm. Purification via precipitation also leads to an increase in $\Delta M$ of 0.8 to 1.2 dNm. $M_L$ is virtually identical for all elastomers.

The compounds were cured at 160° C. and characterized by stress-strain, compression set and permeability measurements (Table 10). Irrespective of the applied purification method, the purification leads to a slight but significant increase in modulus and tensile strength. Similarly, the compression set decreases (if compared within the same study) by 3-6%, which is beneficial for pharmaceutical closure applications (see Example 16 vs. Example 13, Example 18 vs. Example 17, and Examples 22-25 vs. Examples 19-21). The permeability to gases is substantially the same within the experimental error.

Since purified BB 2030 has an enhanced cure activity it is possible to decrease curative loading while still producing a material that substantially matches the physical properties of a control material produced from unpurified BB 2030. The impact of curative level on vulcanizate properties was studied.

TABLE 9

| Example | 13 | 14 | 15 | 16 | 17 | 18 |
|---|---|---|---|---|---|---|
| Elastomer | Com. Batch 1 | UF-34% | UF-20% | UF-8% | Com. Batch 2 | Prec.-2% |
| Oligomer level | 2200 | 750 | 440 | 180 | 2600 | 47 |
| Curative level | 100% | 100% | 100% | 100% | 100% | 100% |
| Com. Batch 1 | 100 | | | | | |
| UF-34% | | 100 | | | | |
| UF-20% | | | 100 | | | |
| UF-8% | | | | 100 | | |
| Com. Batch 2 | | | | | 100 | |
| Prec.-2% | | | | | | 100 |
| PE AC-617A | 2 | 2 | 2 | 2 | 2 | 2 |
| Polyfil 80 | 85 | 85 | 85 | 85 | 85 | 85 |
| ZOCO 104 | 3.00 | 3.00 | 3.00 | 3.00 | 3.00 | 3.00 |
| Resin SP-1045 | 1.50 | 1.50 | 1.50 | 1.50 | 1.50 | 1.50 |
| Stearic acid | 0.75 | 0.75 | 0.75 | 0.75 | 0.75 | 0.75 |

| Example | 19 | 20 | 21 | 22 | 23 | 24 | 25 |
|---|---|---|---|---|---|---|---|
| Elastomer | Com. Batch 2 | Lab-Control | Lab-Control | Prec.-3% | Prec.-3% | Prec.-3% | Prec.-3% |
| Oligomer level | 2600 | 2750 | 2750 | 81 | 81 | 81 | 81 |
| Curative level | 100% | 100% | 65% | 100% | 93% | 80% | 65% |
| Com. Batch 2 | 100 | | | | | | |
| Lab-Control | | 100 | 100 | | | | |
| Prec.-3% | | | | 100 | 100 | 100 | 100 |
| PE AC-617A | 2 | 2 | 2 | 2 | 2 | 2 | 2 |
| Polyfil 80 | 85 | 85 | 85 | 85 | 85 | 85 | 85 |
| ZOCO 104 | 3.00 | 3.00 | 1.95 | 3.00 | 2.78 | 2.40 | 1.95 |
| Resin SP-1045 | 1.50 | 1.50 | 0.98 | 1.50 | 1.39 | 1.20 | 0.98 |
| Stearic acid | 0.75 | 0.75 | 0.49 | 0.75 | 0.69 | 0.60 | 0.49 |

TABLE 10

| | | Example | 13 | 14 | 15 | 16 | 17 | 18 |
|---|---|---|---|---|---|---|---|---|
| | | Elastomer | Com. Batch 1 | UF-34% | UF-20% | UF-8% | Com. Batch 2 | Prec.-2% |
| | | Oligomer level | 2200 | 750 | 440 | 180 | 2600 | 47 |
| | | Curative level | 100% | 100% | 100% | 100% | 100% | 100% |
| MDR, 160° C., 1.7 Hz, 1° Arc, 30 min | $M_H$ (dN·m) | | 8.88 | 9.76 | 9.76 | 10.22 | 8.95 | 10.38 |
| | $M_L$ (dN·m) | | 2.03 | 2.20 | 2.25 | 2.18 | 2.06 | 2.43 |
| | $M_H - M_L$ (dN·m) | | 6.85 | 7.56 | 7.51 | 8.04 | 6.89 | 7.95 |
| | $t_{S2}$ (min) | | 3.53 | 3.29 | 3.20 | 4.57 | 5.06 | 4.95 |
| | $t_{90}$ (min) | | 10.11 | 9.90 | 9.49 | 10.06 | 11.18 | 11.66 |
| Physical properties, cured at 160° C. for $t_{90}$ + 5 min | Hardness Shore A2 (pts.) | | 49 | 49 | 49 | 50 | 50 | 50 |
| | Ultimate Tensile (MPa) | | 5.56 | 6.08 | 6.07 | 6.20 | 5.82 | 6.48 |
| | Ultimate Elongation (%) | | 864 | 837 | 837 | 827 | 859 | 831 |
| | Stress @ 25 (MPa) | | 0.57 | 0.59 | 0.58 | 0.60 | 0.57 | 0.60 |
| | Stress @ 50 (MPa) | | 0.72 | 0.75 | 0.75 | 0.77 | 0.73 | 0.77 |
| | Stress @ 100 (MPa) | | 0.89 | 0.98 | 0.98 | 1.02 | 0.92 | 1.02 |
| | Stress @ 200 (MPa) | | 1.17 | 1.33 | 1.33 | 1.37 | 1.23 | 1.41 |
| | Stress @ 300 (MPa) | | 1.35 | 1.56 | 1.50 | 1.59 | 1.44 | 1.66 |
| Comp. Set | 24 h at 70° C. | | 34 | n.d. | n.d. | 29 | 31 | 29 |
| | 70 h at 100° C. | | 57 | n.d. | n.d. | 51 | 54 | 51 |
| Permeability | (mm cm³/m⁻² d⁻¹) | | n.d. | n.d. | n.d. | 134 | 136 | 132 |

| | | Example | 19 | 20 | 21 | 22 | 23 | 24 | 25 |
|---|---|---|---|---|---|---|---|---|---|
| | | Elastomer | Com. Batch 2 | Lab-Control | Lab-Control | Prec.-3% | Prec.-3% | Prec.-3% | Prec.-3% |
| | | Oligomer level | 2600 | 2750 | 2750 | 81 | 81 | 81 | 81 |
| | | Curative level | 100% | 100% | 65% | 100% | 93% | 80% | 65% |
| MDR, 160° C., 1.7 Hz, 1° Arc, 30 min | $M_H$ (dN·m) | | 9.13 | 8.94 | 8.18 | 10.12 | 10.14 | 9.96 | 9.50 |
| | $M_L$ (dN·m) | | 2.37 | 2.31 | 2.47 | 2.68 | 2.75 | 2.74 | 2.77 |
| | $M_H - M_L$ (dN·m) | | 6.76 | 6.63 | 5.71 | 7.44 | 7.39 | 7.22 | 6.73 |
| | $t_{S2}$ (min) | | 5.44 | 4.73 | 5.57 | 5.06 | 5.45 | 5.57 | 5.98 |
| | $t_{90}$ (min) | | 11.33 | 9.49 | 10.16 | 11.28 | 11.54 | 11.85 | 12.15 |
| Physical properties, cured at 160° C. for $t_{90}$ + 5 min | Hardness Shore A2 (pts.) | | 49 | 49 | 48 | 49 | 50 | 49 | 49 |
| | Ultimate Tensile (MPa) | | 5.57 | 5.88 | 6.40 | 6.20 | 6.75 | 6.03 | 6.36 |
| | Ultimate Elongation (%) | | 830 | 817 | 839 | 785 | 798 | 781 | 813 |
| | Stress @ 25 (MPa) | | 0.61 | 0.63 | 0.56 | 0.66 | 0.65 | 0.62 | 0.62 |
| | Stress @ 50 (MPa) | | 0.77 | 0.79 | 0.73 | 0.85 | 0.82 | 0.80 | 0.79 |
| | Stress @ 100 (MPa) | | 0.97 | 1.01 | 0.93 | 1.12 | 1.08 | 1.05 | 1.03 |

TABLE 10-continued

|  |  |  |  |  |  |  |  |  |
|---|---|---|---|---|---|---|---|---|
|  | Stress @ 200 (MPa) | 1.29 | 1.35 | 1.30 | 1.59 | 1.50 | 1.50 | 1.49 |
|  | Stress @ 300 (MPa) | 1.53 | 1.59 | 1.62 | 1.91 | 1.76 | 1.82 | 1.85 |
| Comp. | 24 h at 70° C. | n.d. | n.d. | n.d. | n.d. | n.d. | n.d. | n.d. |
| Set | 70 h at 100° C. | 62 | 62 | 62 | 57 | 55 | 57 | 57 |
| Permeability | (mm cm3/m$^{-2}$ d$^{-1}$) | 133 | 130 | 129 | 126 | 126 | 127 | 127 |

Figure 5:
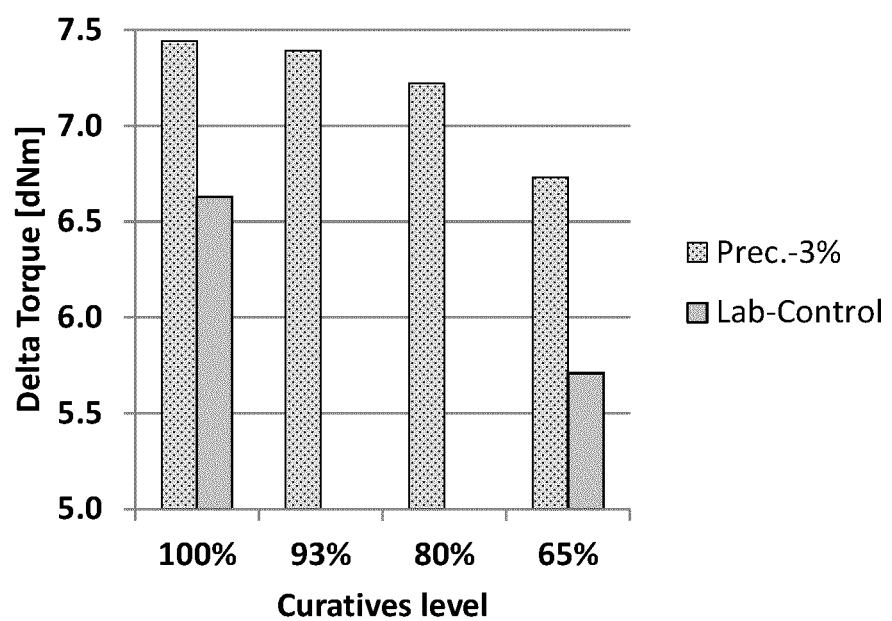
FIG. 5 depicts a graph of change in torque ($\Delta M$, dNm) as a function of curative levels (% based on amount of curative used in a control) for a purified sample of BB 2030 elastomer and an unpurified control sample of BB 2030 elastomer.

As seen in Table 10, Examples 22-25, decreasing the level of resin (SP-1045), ZnO (ZOCO 104) and stearic acid in purified BB 2030 gradually decreases physical properties and ΔM ($M_H$–$M_L$) of the vulcanizate. However, Example 25 using 35% less curative than a control (Example 20) still features properties that are on par or better than those of the control (Example 20). One example is shown in FIG. 5, which shows ΔM as a function of curative level, where ΔM for Prec.-3%-65% Curatives matches that of Lab-Control—100%.

The novel features will become apparent to those of skill in the art upon examination of the description. It should be understood, however, that the scope of the claims should not be limited by the embodiments, but should be given the broadest interpretation consistent with the wording of the claims and the specification as a whole.

What is claimed is:

1. A process for curing a polyisoolefin copolymer comprising isobutylene and isoprene units, the process comprising
reducing a content of an oligomer, the oligomer comprising one or both of a $C_{13}$ and a $C_{21}$ unsaturated cyclic oligomer, to 900 ppm or less in a mixture of the oligomer and the polyisoolefin copolymer comprising isobutylene and isoprene units to produce an oligomer-depleted mixture, and
adding a resin cure system to the oligomer-depleted mixture to cure the polyisoolefin copolymer.

2. The process according to claim 1, further comprising reducing the content of the oligomer in the mixture by filtering the mixture of the oligomer and the polyisoolefin copolymer in an organic solvent through a semipermeable ultrafiltration membrane.

3. The process according to claim 2, wherein the oligomer depleted mixture is a retentate of the filtration.

4. The method according to claim 3, further comprising maintaining concentration of the polyisoolefin copolymer in the organic solvent at 2-40 wt. % based on total weight of the mixture.

5. The process according to claim 3, wherein the filtering is performed at a temperature of from 30-200° C., optionally 40-130° C., optionally at a pressure in a range of from 2-50 bar.

6. The process according to claim 3, wherein:
the organic solvent comprises one or more stabilizers for the polyisoolefin copolymer,
the one or more stabilizers comprise particulate solids insoluble in the organic solvent, non-permeating liquids immiscible in the organic solvent, or a combination thereof, and
at least one of the one or more stabilizers is retained in the retentate in an amount of from about 80-100 wt. % based on weight of the original amount of the at least one stabilizer in the organic solvent, optionally about 95-100 wt. %.

7. The process according to claim 6, wherein the one or more stabilizers comprise an acid scavenger, optionally comprising a metal carboxylate, optionally in the form of a particulate solid, or a metal oxide or hydroxide, optionally comprising calcium stearate or sodium hydroxide, or a mixture of a metal carboxylate and a metal oxide or hydroxide.

8. The process according to claim 3, wherein a molecular weight of the polyisoolefin is decreased by less than about 15% during the filtering step.

9. The process according to claim 3, wherein the organic solvent comprises hexane, pentane, isohexane, isopentane or any mixture thereof and optionally the mixture comprises about 1-60 wt. % water based on the total weight of the mixture.

10. The process according to claim 2, wherein the filtering comprises a crossflow ultrafiltration, optionally a constant volume crossflow ultrafiltration, optionally having a crossflow velocity of the solution across the ultrafiltration membrane in a range of from 0.5-10 m/s.

11. The process according to claim 10, further comprising maintaining crossflow velocity ($v_{CF}$) of the solution across the ultrafiltration membrane, concentration ($y_{IIR}$) of the polyisoolefin copolymer in the solution and permeate flux (J) through the ultrafiltration membrane to satisfy Equation 1:

$$\alpha = \frac{y_{IIR} J}{v_{CF}} \qquad \text{Equation 1}$$

where α is a unitless quantity greater than 3×10$^{-7}$.

12. The process according to claim 1, further comprising reducing the content of the oligomer in the mixture by precipitating the polyisoolefin copolymer from a solution of the mixture in a solvent.

13. The process according to claim 1, wherein curing the polyisoolefin copolymer in the oligomer-depleted mixture increases cure state of the polyisoolefin copolymer by at least 8% compared to a cure state of the polyisoolefin copolymer when cured in a mixture having an oligomer content of more than 900 ppm.

14. The process according to claim 1, wherein the content of the oligomer in the mixture is reduced to 250 ppm or less.

15. The process according to claim 1, wherein the resin cure system includes a halogenated phenol formaldehyde resin.

16. The process according to claim 15, wherein the resin cure system includes an activator.

17. The process according to claim 15, wherein the resin cure system includes a metal oxide.

18. The process according to claim 17, wherein the metal oxide is zinc oxide.

19. The process according to claim 15, wherein the resin cure system includes a processing aid.

20. The process according to claim 19, wherein the processing aid includes stearic acid.

21. The process according to claim 15, wherein the amount of the resin is about 0.2 to about 10 parts by weight, based on the total weight of the polyisoolefin copolymer.

22. The process according to claim 1, wherein resin cure system includes a phenol formaldehyde resin.

23. The process according to claim 22, wherein the resin cure system includes an activator.

24. The process according to claim 22, wherein the resin cure system includes a metal oxide.

25. The process according to claim 24, wherein the metal oxide is zinc oxide.

26. The process according to claim 22, wherein the resin cure system includes a processing aid.

27. The process according to claim 26, wherein the processing aid includes stearic acid.

28. The process according to claim 22, wherein the amount of the resin is about 0.2 to about 10 parts by weight, based on the total weight of the polyisoolefin copolymer.

29. The process according to claim 1, wherein the resin cure system includes an alkyl phenol formaldehyde derivative.

* * * * *